F. C. ZAHNOW.
COMBINED COLLISION BUFFER AND DIRECTION INDICATOR FOR VEHICLES.
APPLICATION FILED JUNE 4, 1919.
1,337,872.
Patented Apr. 20, 1920.
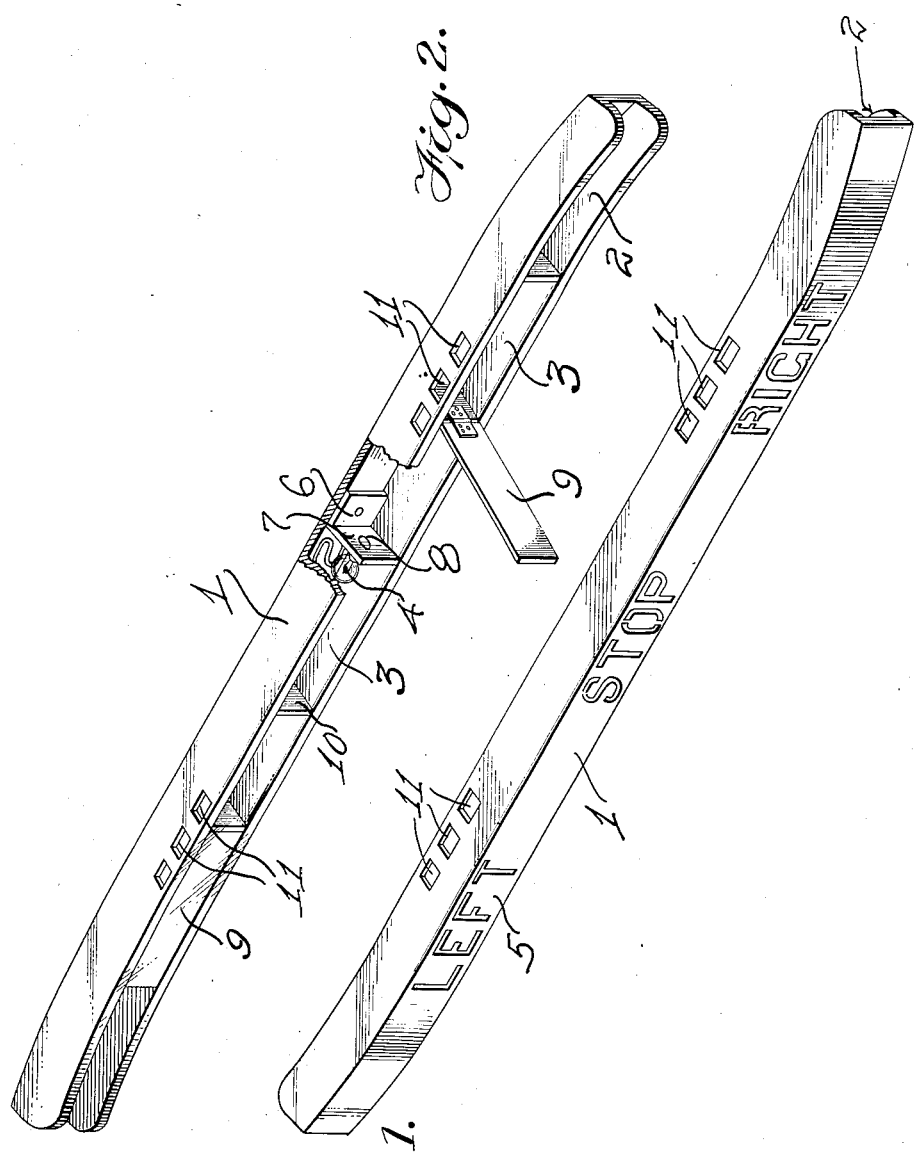
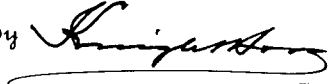

UNITED STATES PATENT OFFICE.

FRANK C. ZAHNOW, OF SPRINGFIELD, MISSOURI, ASSIGNOR OF ONE-HALF TO L. H. GLEASON, OF SPRINGFIELD, MISSOURI.

COMBINED COLLISION-BUFFER AND DIRECTION-INDICATOR FOR VEHICLES.

1,337,872.  Specification of Letters Patent.  Patented Apr. 20, 1920.

Application filed June 4, 1919. Serial No. 301,723.

*To all whom it may concern:*

Be it known that I, FRANK C. ZAHNOW, a citizen of the United States, residing at Springfield, in the county of Greene and State of Missouri, have invented certain new and useful Improvements in Combined Collision-Buffers and Direction-Indicators for Vehicles, of which the following is a specification.

The present invention relates to a so-called accessory for motor vehicles, and particularly a combined collision buffer and direction indicator. The primary object of the invention is to provide a combined collision buffer and direction indicator for automobiles, in which the collision buffer will efficiently perform its intended use and at the same time offer provisions for incorporating the direction indicator in its construction.

As heretofore practised, direction indicators for automobiles have been generally located somewhere on the vehicles as to be readily observed by an approaching vehicle, and operated in a manner to indicate the direction to be taken by the vehicle on which the same is mounted. They are usually provided with the captions "Left", "Right" and "Stop". This is accomplished in various ways, but the conventional types usually employ light housings with descriptive perforations, these housings being carried on the rear of the vehicle, sometimes being duplicated in the front. It has been found rather impractical to equip an automobile with these direction indicators, principally because they do not lend a pleasing appearance to the vehicle, and for other apparent reasons. The direction indicator proposed by the present invention overcomes such disadvantages by incorporating the indicator with the collision buffer. Thus, not only are these two desirable accessories incorporated into one, but the appearance of the vehicle need not be sacrificed by equipping it with an indicator such as proposed by the invention.

Further features will be described with reference to the accompanying drawing, in which:

Figure 1 is a perspective view of the front of a collision buffer, illustrating the application of the invention; and Fig. 2 is a rear view of the same.

Referring to the drawing in detail, the buffer herein illustrated, and constituting a combined buffer and direction indicator, preferably comprises a channel member. Such buffers are well-known and have proven quite satisfactory, and as this particular type is best adapted for carrying out the present invention, it has been chosen as a preferred embodiment. However, the invention is not limited to use with this particular type of buffer, as, broadly, the idea finds expression in equipping any kind of buffer with a direction signal. As stated, the buffer in this instance consists of a channel member 1, having the usual recessed portion 2, which extends throughout its length. In use the buffer may be applied to either the front or the rear of the vehicle, or to both the front and the rear. In equipping the buffer to accommodate the direction indicator, the recessed portion 2 is divided into a series of compartments 3, preferably three in number, to house a like number of lights 4 which are selectively used to indicate to an approaching vehicle whether the vehicle on which the indicator is mounted is to take a course to the right or the left, or to stop. For instance, should the buffer be mounted on the rear of the vehicle, a three-way switch, positioned conveniently near the operator's seat, would be used to close the circuit and thus light any one of the three lights, in which event the light would radiate through the perforated side of the buffer, as at 5, indicating that the vehicle would take a course to the left; should the vehicle be supplied with one of these buffers on both the front and the rear, the wiring system could be arranged to simultaneously light both the front and the rear compartments. A suitable mounting for the light may be had by means of the angle pieces 6, which also serve to divide the recess 2 into compartments. These angle pieces are secured to the front wall of the channel member by means of a suitable rivet, and are constructed with light mounting extensions 7, which are provided with a suitable opening, such as 8, to receive the socket of the light, whereby the light may be properly mounted in the compartment. To exclude dirt from the compartments, as well as to protect the lights carried therein, each compartment is provided with a swinging door or cover 9, which is hinged to the extension 7 preferably by a spring hinge, which will always retain the cover closed. The end of the compartment opposite the light mounting is composed of a suitable piece 10, which may be a like structure as the angle pieces. It serves as an abutment for the outer end of the cover 9, and is inlaid slightly within the recess 2, in order that the cover when closed will be flush with the edges of the channel member. The channel member is further provided with openings 11 for mounting the buffer on the vehicle.

Claims:

1. A combined collision buffer and direction indicator, comprising a channel member having a series of light supports, lights adapted to be carried thereby, and perforations in the rear wall of said channel member adjacent each light and coacting with said lights to constitute signals.

2. A collision buffer for vehicles, comprising a channel member, having a series of light compartments, light supports in said compartments, one side of said compartments having perforations adapted to radiate light therefrom, and covers for closing the opposite side of the compartments.

3. A combined direction indicator and collision buffer for vehicles, comprising a channel member divided into a series of compartments providing light housings, light supports in said housings, perforations in each of the compartments, said light supports comprising angle pieces secured to the front wall of the channel member having light mounting extensions projecting at right angles and terminating at the rear edge of the channel member, and covers for the compartments secured to said extensions.

4. In combination with a collision buffer for vehicles, a direction indicator, comprising a series of light supports, lights adapted to be carried thereby, a perforated descriptive front for each of the lights whereby the light in radiating through the perforations will indicate the direction to be taken by the vehicle.

FRANK C. ZAHNOW.